United States Patent
Frignac et al.

(10) Patent No.: US 7,302,194 B2
(45) Date of Patent: Nov. 27, 2007

(54) OPTICAL FILTER AND TRANSMISSION SYSTEM INCORPORATING AN OPTICAL FILTER

(75) Inventors: Yann Frignac, Paris (FR); Sébastien Bigo, Massy (FR)

(73) Assignee: Alcatel, Paris (FR)

( * ) Notice: Subject to any disclaimer, the term of this patent is extended or adjusted under 35 U.S.C. 154(b) by 719 days.

(21) Appl. No.: 10/626,849

(22) Filed: Jul. 25, 2003

(65) Prior Publication Data
US 2005/0036784 A1   Feb. 17, 2005

(30) Foreign Application Priority Data
Aug. 12, 2002   (EP)   ................... 02360237

(51) Int. Cl.
*H04B 10/06* (2006.01)
(52) U.S. Cl. ..................... 398/213
(58) Field of Classification Search ............... 398/141, 398/85, 212–213
See application file for complete search history.

(56) References Cited

U.S. PATENT DOCUMENTS

| | | | |
|---|---|---|---|
| 5,469,288 A | | 11/1995 | Onaka et al. |
| 5,638,473 A | * | 6/1997 | Byron ..................... 385/37 |
| 5,696,859 A | * | 12/1997 | Onaka et al. .............. 385/24 |
| 2003/0002112 A1 | * | 1/2003 | Hirano et al. ............ 359/161 |
| 2003/0123884 A1 | * | 7/2003 | Willner et al. ........... 398/212 |
| 2004/0033020 A1 | * | 2/2004 | LoCascio et al. .......... 385/37 |
| 2004/0208428 A1 | * | 10/2004 | Kikuchi et al. ............ 385/24 |

FOREIGN PATENT DOCUMENTS

| | | |
|---|---|---|
| EP | 0534644 A2 | 3/1993 |
| EP | 1143643 A2 | 1/2001 |
| EP | 1233563 A1 | 8/2002 |

OTHER PUBLICATIONS

S. Bigo et al, "Multi-Terabit/s Transmission Over Alcatel Teralighttm Fiber", Electrical Communication, Alcatel, Brussels, GE, No. 4, Oct. 1, 2000, pp. 288-296, XP000976732.
S. Bigo et al, "10.2Tbit/s (256.42.7Gbit/s PDM/WDM) transmission over 100Km Teralight with 128bit/s/Hz spectral efficiency" Optical Fiber Communication Conference.(O9FC) Technical Digest Postconference Edition. Mar. 17-22, 2001, Trends in Optics and Photonics Series. vol. 54, vol. 1 of 4, pp. 251-253, XP002176542.
C. G. Joergensen et al, "High Sensitivity Fibre Preamplifier Receiver for Multichannel Applications" Electronics Letters, IEEE Stevenage, GB, vol. 27, No. 23, Nov. 7, 1991, pp. 2153-2155, XP000268353.

* cited by examiner

*Primary Examiner*—Leslie Pascal
(74) *Attorney, Agent, or Firm*—Sughrue Mion, PLLC

(57) ABSTRACT

The present invention specially deals with a transmission system in which at least two coded optical signals are multiplexed and transmitted between an emitter and a receiver, a first of said coded signals providing a first spectrum having a first carrier wavelength and two sidebands, a second of said coded signals providing a second spectrum having a second carrier wavelength higher than said first carrier wavelength and two side-bands. This transmission system comprises at least one optical filter with to combined filters for the carrier wavelength and the respective sideband.

7 Claims, 3 Drawing Sheets

OPTICAL FILTER AND TRANSMISSION SYSTEM INCORPORATING AN OPTICAL FILTER

The invention is based on a priority application EP 02 360 237.8 which is hereby incorporated by reference.

BACKGROUND OF THE INVENTION

The invention relates to the field of transmitting digital data by optical means. It is more particularly concerned with transmission at high bit rates on long-haul fiber optic links.

More detailed the invention is related to a frequency adjustment scheme for an optical filter.

The invention is also related to a transmission system with a transmitter function, a transmitting fiber and a receiver function and the transmitter function comprises light sources, with modulators and a wavelength multiplexer and the receiver function comprises, a wavelength demultiplexer, adjustable filters and receivers.

Such transmission scheme uses an optical transmitter connected to an optical receiver by the fiber link. The transmitter generally modulates the power of an optical carrier wave from a laser oscillator as a function of the information to be transmitted. NRZ or RZ modulation is very frequently used and entails varying the power of the carrier wave between two levels: a low level corresponding to extinction of the wave and a high level corresponding to a maximum optical power. The variations of level are triggered at times imposed by a clock rate and this defines successive time cells allocated to the binary data to be transmitted. By convention, the low and high levels respectively represent the binary values "0" and "1".

The maximum transmission distance is generally limited by the ability of receivers to detect without error these two power levels after the modulated wave has propagated in the optical link. The usual way to increase this distance is to increase the ratio between the average optical power of the high levels and that of the low levels; this ratio defining the "extinction ratio" which is one of the characteristics of the modulation.

For a given distance and a given extinction ratio, the information bit rate is limited by chromatic dispersion generated in the fibers. This dispersion results from the effective index of the fiber depending on the wavelength of the wave transported, and it has the consequence that the width of the transmitted pulses increases as they propagate along the fiber.

This phenomenon is characterized by the dispersion coefficient D of the fiber, which is defined as a function of the propagation constant $\beta$ by the equation $D=-(2\pi c/\lambda^2)d^2\beta/d\omega^2$, where $\lambda$ and $\omega$ are respectively the wavelength and the angular frequency of the wave.

Not only chromatic dispersion limits the possibility of transmission, but it is a main factor for distortion. Increasing the data rate up to higher levels—we are talking about T Bit/s—the effects of the fibers increase the impact on the received signal. One solution is the use of DWDM (dense wavelength division multiplex) systems to increase the bit rate. The wavelength channels are selected in a way that the information of the single channels can be selected at receiver side and analyzed with an acceptable bit/error rate.

Again the bit rate is limited by the spectrum of the channels.

A modulation scheme know as VSB (vestigial side bond modulation) is explained in "5.12 Tbit/s Transmission over 3×100 km of Teralight fiber" Bigo, S. et al., paperPD2, PP40-41, ECOC 2000.

The two side bands of a NRZ spectrum generally contain redundant information. It is therefore tempting to filter out one of them in order to increase spectral efficiency, a technique known as VSB. However VSB is difficult to implement at the transmitter because the suppressed side bands rapidly reconstruct through fiber non-linearities.

So a VSB filtering at the receiver side is proposed. With modulation and filtering scheme like VSB the bandwidth efficiency increase to a value of more than 0.6 bit/s/Hz compared with 0.4 bit/s/Hz in conventional systems.

Again the transmission is limited due to the effects of cross talking between the adjacent channels.

One critical point is the fine adjustment of the optical filter either at the transmitter or the receiver side of the transmission line. The positioning of the filter in the wavelength multiplex limits the maximum useable bandwidth of the transmission system. One conventional approach to lock the wavelength division multiplex filter onto a given channel wavelength is to maximize in a feed back loop the output power, so that the maximum of the transmission is found. For VSB modulation schemes the filter must be locked on one of the edges of the transmission line and therefore this method cannot apply to VSB transmission lines.

In the EP 1143 643 a filter is used to filter optical sidebands by a measurement of both reflecting and transmitting part of the filter and a comparison between the two derived signals. When both levels counts equal the filter is well positioned with this method.

This filter doesn't run in a VSB transmission scheme with alternate channel spaces as described in the application EP 2001440033. Furthermore the method of EP 1143643 can be hardly used for a proper filter positioning. The condition of equality between transmitted and reflected powers does not correspond to optimal performance of the system. Indeed it has been demonstrated experimentally that a VSB filter must exhibit a particular asymmetric intensity phase shape. The suppression of side band through the narrow filter must be thorough in order to obtain good bit-error performance.

SUMMARY OF THE INVENTION

An object of the invention is to implement an optical filter in a VSB transmission system which is filtering out a part of a coded optical signal spectrum having redundant information in such a way that transmission performance are optimised.

For this purpose, the present invention proposes an optical filter for filtering out at least a part of one of two spectral side-bands of a coded optical signal spectrum having a carrier wavelength, said optical filter comprising a first filter having a transmission response in intensity having a maximum value at a central filter wavelength and a second filter having a transmission response distinct from said carrier wavelength and located in said transmitted side-band The present invention specially deals with a transmission system in which at least two coded optical signals are multiplexed and transmitted between an emitter and a receiver, a first of said coded signals providing a first spectrum having a first carrier wavelength and two sidebands, a second of said coded signals providing a second spectrum having a second carrier wavelength higher than said first carrier wavelength and two side-bands. This transmission system comprises at least one optical filter according to the invention.

The asymmetry of the combined optical filter of the invention can depend on the side bands to filter out a well as the spectral shape of the modulation format and the wavelength allocation scheme used.

In one embodiment of the invention, the first and/or the second optical filters of the invention have a common tuneable central filter wavelength.

The method for filtering the sideband information of a transmitted signal is refined in a way the filter combination is adjustable to the carrier and optimised to the sideband filtering.

SHORT DESCRIPTION OF THE DRAWINGS

Other characteristics and advantages of the invention will appear on reading the following description of embodiments of the invention, given by way of example and with reference to the accompanying drawings, in which.

Figure 1:
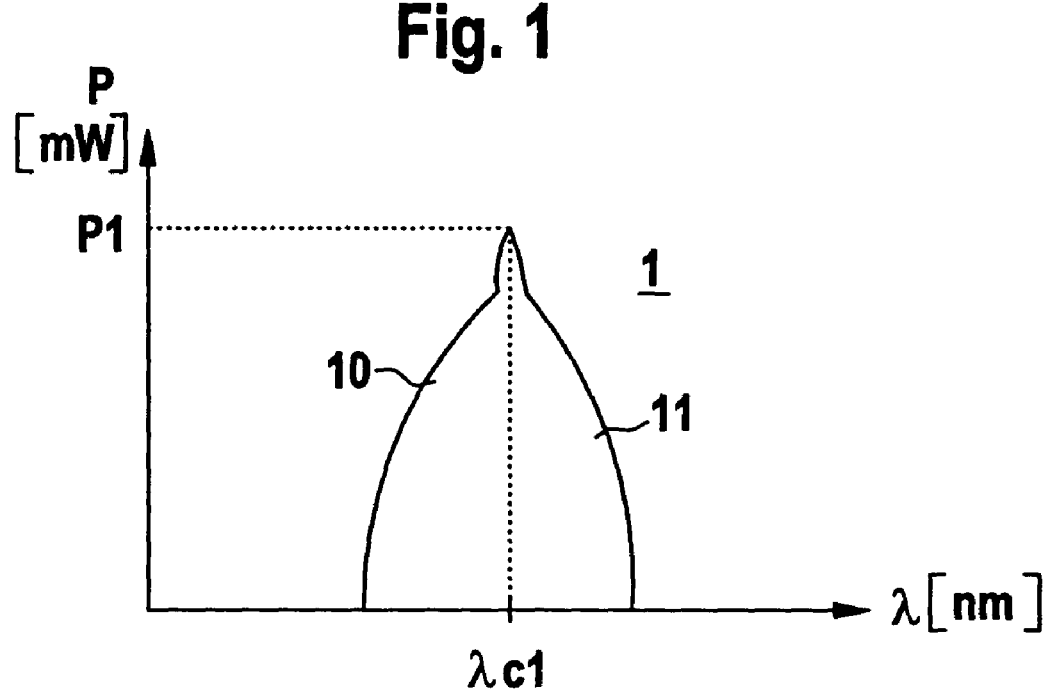
FIG. 1 shows the classical spectrum of an NRZ coded signal.

In optical transmission systems the coded optical signal namely a signal carrying information such as an RZ or NRZ coded signal ((Non) Return to Zero) has intensity modulations. FIG. 1 shows the curve 1 representing the classical spectrum 1 of an NRZ coded signal. This spectrum is shown in terms of optical power P as a function of wavelength λ. This spectrum presents a profile with a carrier wavelength λc1 at a maximum optical power P1 and has two side-bands 10, 111 with respect to this carrier wavelength λc1.

The two side-bands 10, 11 of this NRZ spectrum contain redundant information. It is therefore attractive to filter out one of them in order to improve transmission performance. This technique, known as Vestigial Side-band (VSB) filtering, is used in DWDM (Dense Wavelength Division Multiplexing) transmission systems transmitting NRZ coded signals. It involves a narrow optical filter, narrower than the signal bandwidth, and which is offset with respect to the carrier wavelength.

Figure 2:
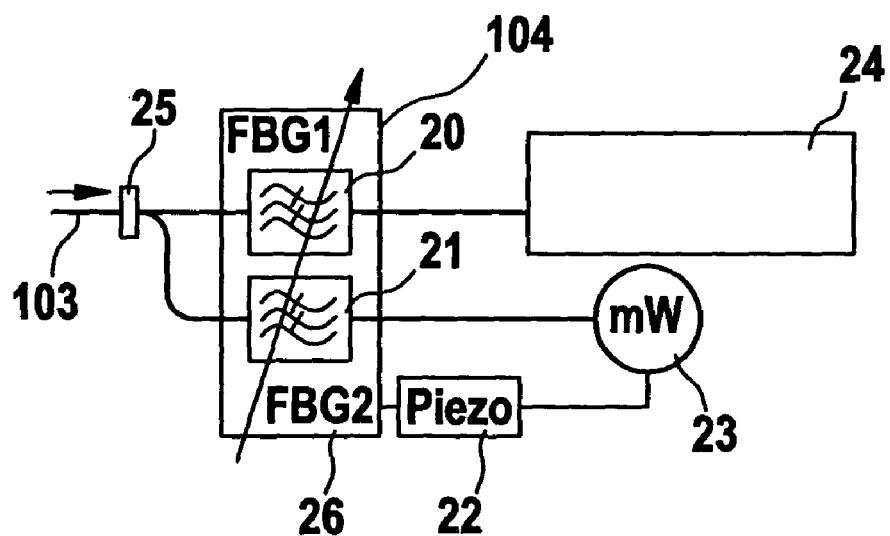
FIG. 2 shows a filter according the invention

FIG. 2 shows an example of VSB filtering at the receiver end (easily extendable to the case of VSB filtering at the transmitter end), with a possible implementation based on two in-fiber Bragg gratings.

A given dual-side-band channel coming from the transmission line 103 is split into two arms of a directional coupler 25, preferably with an unequal power ratio. The first branch with preferably larger power is fed into one narrow VSB Bragg grating 20 of optimal shape. The maximum of this filter is shifted off the carrier wavelength by approximately 15 GHz.

The second branch of the coupler with lower-power level is fed into a second fiber Bragg filter 21 centered on the carrier, whose shape need not be carefully designed, but preferably symmetrical and narrow. The narrower the bandwidth of this filter, the better the sensitivity to a drift of the carrier wavelength. Both filters are mounted on a common device 26 and connected to a common piezo element 22. The output signal of the first filter 20 is connected to a receiver 24. In the receiver all kind of monitoring can be joint to monitor signal quality and bit error rates. The output of the second filter 21 is connected to a power control device 23, which measures absolute power and control the piezo element 22 for an optimization of output power.

Both filters are tunable by a single stretching mechanism of piezoelectric type, such that their peak wavelengths stay stabile shifted by a fixed quantity within typically 0.002 nm accuracy.

The VSB filter is simply locked when the power level at the output of the second filter is maximum, as measured by a low-bandpass photodiode.

Figure 3:
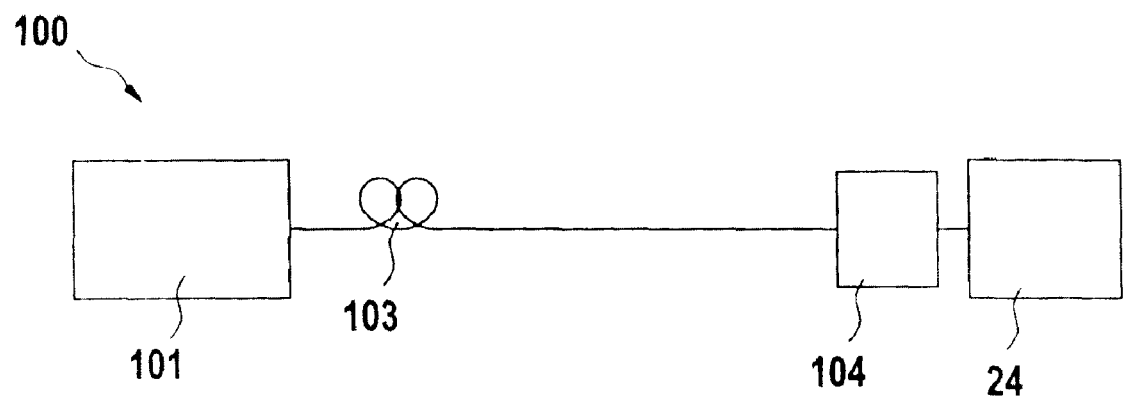
FIG. 3 shows a transmission system in one embodiment of the invention.

FIG. 3 shows a transmission system 100 in one embodiment of the invention transmitting DWDM coded signals (not shown) between a transmitter 101 and a receiver 102 via a transmission line 103 including an optical fiber.

The optical filter of the invention 104 is located close to the receiver 24. The filter 104 has a tuneable central filter wavelength.

Such a DWDM transmission system 100 has very close coded signals and uses an allocation scheme with non equidistant spacing (75 GHz and 50 GHz in alternation) in order to increase the spectral efficiency.

Figure 4:
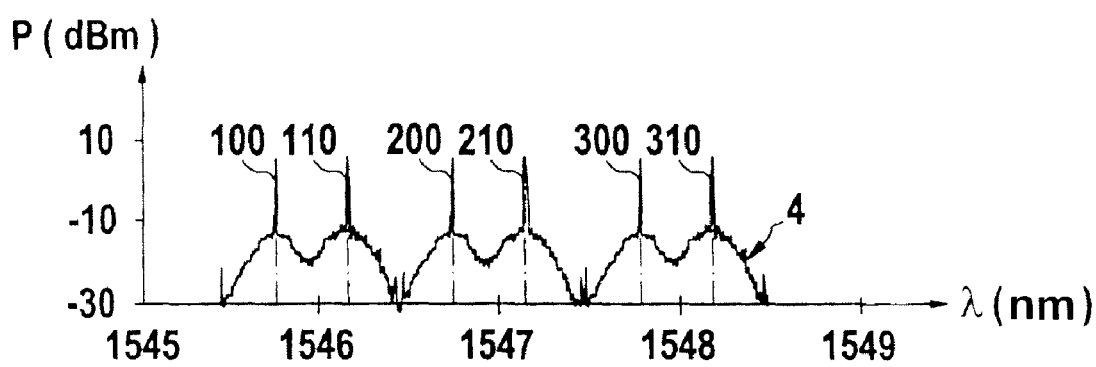
FIG. 4 shows the spectra of DWDM multiplexed signals transmitted by the transmission system of FIG. 3.

FIG. 4 shows a curve 4 representing the spectra of DWDM coded signals transmitted by the transmission system 100.

These spectra are shown in terms of optical power P (logarithmic scale) as a function of wavelength λ. Each spectrum 100, 110, 200, 210, 300, 310 presents a distinct carrier wavelength respectively substantially equal to 1545.72 nm, 1546.12 nm, 1546.72 nm, 1547.12 nm, 1547.72 nm, 1548.12 nm and two spectral side-bands.

For each group of spectra overlapping each other, the spectrum 100, 200, 300 located in the lowest wavelength side has the lowest wavelength side-band which is to be is detected in the receiver and the spectrum 110, 210, 310 located in the highest wavelength side has the highest wavelength side-band which is to be is detected in the receiver.

Figure 5A:
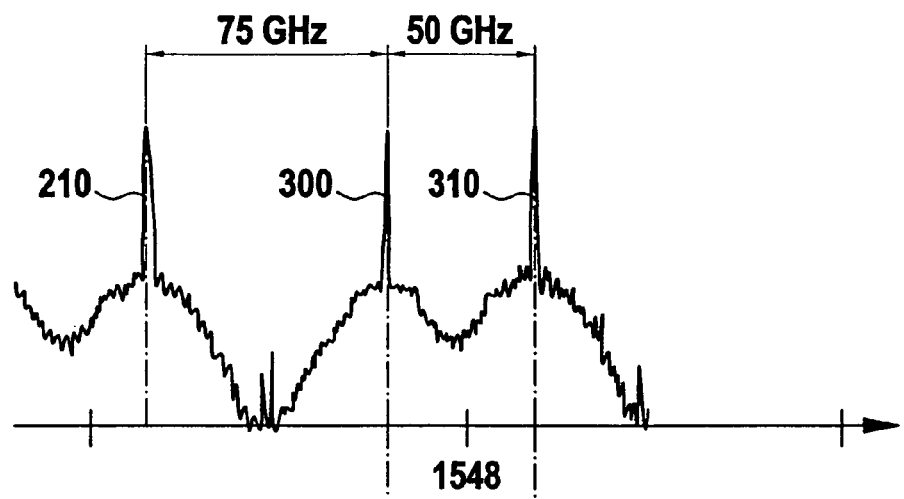
FIGS. 5a and 5b show the transmission response in intensity of the two optical filters of the transmission system of FIG. 3.
Figure 5B:
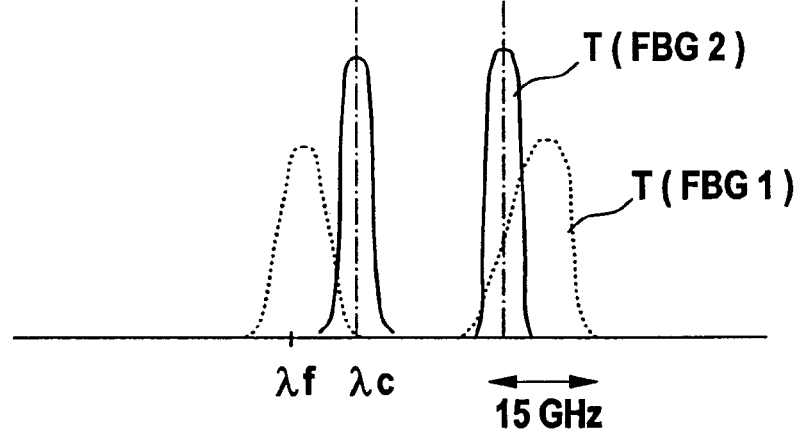

FIGS. 5a and 5b show the curves T(FBG1) and T(FBG2) representing the transmission response in intensity of the two branches in the optical filter of the transmission system 100. The following description is made in combination with FIG. 4.

The transmission responses are shown in terms of transmittance T1, T2 (logarithmic scale) as a function of wavelength %.

Filter 104 filtering two coded signals spectra 300, 310 as shown in FIG. 4.

The filter 104 is filtering out the low wavelength sideband of the spectrum 300.

The transmittance T(FBG2) has a maximum value around −5 dB at a tuneable central filter wavelength meaning the carrier wavelength λ1c The first filter part The transmittance T (FBG1) has a maximum value around −2 dB at a tuneable central filter wavelength λ2f distinct from the carrier wavelength λ2c.

The present invention is not limited to the examples and embodiments described and shown, and the invention can be the subject to numerous variations that are available to the person skilled in the art.

Using Bragg grating filters the common tuning of the two filters can also be made by surrounding them with an index matched solution, a temperature stabilization or an application of any kind of stress and strain.

As an alternative Fabry Perot filters are used. The tuning of this filter type is established by temperature control or free space distance shift.

An advantageous solution is the use of a bulk silica device, a planar lightwave circuit. The coupler and the two branches are designed in waveguides and the Bragg gratings are written in the two branches of the waveguide. The whole device is temperature stabilized.

The shape of the filter response can be an asymmetric Gaussian shape as well as any kind of asymmetric shape such as an asymmetric Bessel shape, a Butterworth shape, an asymmetric flat top shape, an asymmetric apodized shape.

The invention claimed is:

1. An optical transmission system comprising:
   a transmitter unit, a transmission line, and a receiver unit, where each channel has its optical spectrum truncated by a filter function according to a vestigial side-band method;
   wherein the transmitter unit comprises modulators and a wavelength multiplexer for either equidistant or non-equidistant channel spacing;
   the receiver unit comprises a wavelength demultiplexer, and electrical receivers; and
   the filter unit comprises a first filter and a second filter, the second filter having a transmission response with maximum transmission at the central wavelength of the channel, and the first filter having a transmission response with maximum transmission in the relevant sideband of said WDM channel, the filters being tunable.

2. The transmission system according to claim 1, wherein the two filters are tunable with changes of the maximum distance between them.

3. The transmission system according to claim 1, wherein the transmission maxima of the first and the second filters are about 15 GHz apart from each other.

4. The transmission system according to claim 1, wherein the first and the second filter are fiber Bragg grating filters with a common support device.

5. The transmission system according to claim 1, wherein the first and the second filter are Fabry Perot Filters.

6. The transmission system according to claim 1, wherein the first and the second filter are structures in a planar lightwave circuit.

7. A method for optimization of bit error rate in a VSB-WDM transmission system comprising:
   transmitting coded optical signals over a transmission line;
   demultiplexing the WDM channel wavelengths;
   filtering the sideband of the channel wavelengths;
   filtering with two parallel aligned filters where the first filter is filtering the sideband and the second filter is filtering the carrier wavelength;
   adjusting the second filter exactly on the channel wavelength by a feed back loop; and
   maintaining the distance between the maxima of the two filters.

* * * * *